3,355,435
POLYURETHANE CASTING COMPOSITIONS CROSSLINKED BY BIS (AMINOARYLENE) SULFONES
Anthony F. Finelli, Akron, Ohio, assignor to The Goodyear Tire & Rubber Company, Akron, Ohio, a corporation of Ohio
No Drawing. Filed Feb. 3, 1965, Ser. No. 430,187
5 Claims. (Cl. 260—75)

This application is a continuation-in-part of application Ser. No. 79,155, filed Dec. 29, 1960 and now abandoned.

This invention relates to a process for preparing polyurethane elastomers which are truly crosslinked but yet are relatively soft, and to the product thereof. More particularly, this invention in one of its aspects relates to the preparation of castable polyurethane reaction mixtures which are fluid and have sufficient pot life to permit castings having relatively large masses to be cast even though the aromatic diamine used in the reaction mixture as a crosslinking agent does not contain a chlorine atom.

Many patents teach that castable polyurethanes may be made readily with reaction mixtures containing diamines as the crosslinking agent but experience has demonstrated that for these teachings to be valid they must be construed and limited to the casting of relatively small masses except where the extending and/or crosslinking agent is a chlorinated aromatic diamine. In the exceptional case where the chlorinated diamines are used as crosslinking agents, it is possible to make castings of relatively large objects without the reacting mixture setting or congealing in the kettle. Unfortunately the castable reaction mixtures using chlorinated aromatic diamine inherently give polyurethane elastomers which are relatively hard. Normally they have a hardness of from 75 to 100 Shore A. It is true softer stocks can be made with these polyurethane elastomers, that is, down to about 50 to 55 but these stocks have the disadvantage of inferior processibility and properties since they are no longer truly crosslinked. The experienced rubber chemist in the field of polyurethane elastomers has realized for some time that a need existed for a method to prepare relatively soft polyurethane elastomers which were truly crosslinked to obtain optimum strength properties for the Shore A hardness range of less than about 65, preferably less than about 55 and greater than 30, and yet obtain a reaction mixture which was fluid for sufficient time to permit castings to be made of objects having relatively large masses.

Another disadvantage associated with the use of chlorinated diamines as crosslinking agents in the preparation of fluid castable reaction mixtures comprising an organic diisocyanate, a reactive hydrogen containing polymeric material and a chlorinated diamine is that a range of Shore A hardness cannot be produced with the same recipe, thus it is necessary to store several types of prepolymers in order to obtain a range of Shore A hardness polyurethanes and to greatly modify the rubber recipe.

A principal object of this invention is to provide soft polyurethane elastomers that are truly crosslinked and thus obtain optimum strength properties relative to the hardness values of these elastomers. A further object of this invention is to provide a process for crosslinking a polyurethane reaction mixture with an aromatic diamine that is free of chlorine and yet obtain a reaction mixture which has improved pot life which with certain diisocyanates will permit relatively large castings to be poured. A still further object of this invention is to provide a new method for obtaining a soft polyurethane elastomer stock having good strength and good processing properties for the hardness level of said stock. Another object of this invention is to provide relatively soft polyurethane elastomers which are truly crosslinked and thus permit fillers to be added to raise the hardness level and thereby obtain a hard polyurethane elastomer which will be in a more favorable position to complete economically with other non-polyurethane rubber products. Still another object of this invention is to provide a process where the same prepolymer and cure recipe can be utilized to obtain cured polyurethane elastomers having Shore A hardness from soft to hard by changing the diamine crosslinking agent from a chlorinated diamine to a bis (aminoarylene) sulfone. Other objects and advantages of this invention will be readily apparent from the description and claims.

The objects of this invention may be accomplished by reacting an excess of an organic diisocyanate with a polyester polyol or a polyesteramide having a molecular weight of at least about 700 and then crosslinking this reaction product by reacting the excess isocyanate with a bis (aminoarylene) sulfone. Thus, it is possible to react the commercially available polyester diols and polyesteramides with the more desirable organic diisocyanates selected from the class consisting of tolylene diisocyanate (TDI), tolidine diisocyanate (TODI), and 4,4'-diphenylmethane diisocyanate (MDI), and after these two reagents have reacted, the bis (aminoarylene) sulfone is added to crosslink and cure the resulting polyurethane elastomer. Normally, the ratio of diisocyanate to polyester diol or polyesteramide can vary from about 1 to 1 up to 3 or 4 to 1. The preferred ranges are from about 1.2 to 1 to about 2 to 1.

Representative polyester polyols useful in this invention may be obtained by condensing a polybasic (preferably dibasic carboxylic) organic acid, such as adipic, sebacic, phthalic, isophthalic, terephthalic, succinic, maleic, cyclohexane-1,2-dicarboxylic, cyclohexane-1,4-dicarboxylic, naphthylene-1,2-dicarboxylic, fumaric, itaconic, etc., with polyalcohols such as ethylene glycol, diethylene glycol, pentaglycol, glycerol, sorbitol, triethanolamine, di(B-hydroxyethyl) ether, etc. and/or amino-alcohols such as ethanolamine, 3-aminopropanol, 4-aminopropanol, 5-aminopentanol-1,6-aminohexanol, 10-aminodecanol, 6-amino-5-methylhexanol-1, p-hydroxymethylbenzylamine, etc. The preferred acids for this purpose are adipic and sebacic and the preferred glycols are those having from 2 to 4 carbon atoms. The polyesteramides can be made by reacting mixtures of the above polyalcohols and acids with at least one of the following amines: ethylene diamine, hexamethylene diamine, 3-methylhexamethylene diamine, decamethylene diamine, and m-phenylene diamine, etc. and/or aminoalcohols with the above dicarboxylic acids. In the esterification, the acid per se may be used for condensation or, where desirable, equivalent components, such as the acid halide or anhydride may be used. The polyester diols and polyesteramides, preferably, should have an acid number less than about 5.

Representative examples of the organic polyisocyanates useful in the practice of this invention include hexylene-1,6 - diisocyanate, cyclohexylene - 1,2-diisocyanate, m-phenylene diisocyanate, 2,4-tolylene diisocyanate, 2,6-tolylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, meta-xylylene diisocyanate, 1-5-naphthylene diisocyanate, and related aromatic and aliphatic polyisocyanates.

The preferred polyisocyanates useful in this invention are those which react with diamine to yield fluid reaction mixtures which may be readily cast. A very satisfactory test for selecting diisocyanates which will react with diamines to permit the reaction mixture to be worked up and cast is to make semimolar solutions of the diisocyanate and a similar solution of diamine in methylene chloride, then raise these solutions to the boiling point of the methylene chloride and mix them together. If a turbidity does not develop on mixing 25–30 seconds, this diisocyanate can be used to form a liquid castable reaction mixture comprising said diisocyanate, a polyester diol or a polyesteramide and a bis (aminoarylene) sulfone. The preferred diamine for use in this test is orthodichlorobenzidine.

Representative examples of the bis amino arylene sulfones are those amino sulfones where the arylene group is phenylene, tolylene, xylene, etc. with the amino group attached to the benzene ring in any of the usual positions. The preferred amino sulfones are bis 3,3'-amino phenyl sulfones and bis 4,4'-amino phenyl sulfones.

This invention will be further understood by the following examples wherein all parts are by weight unless otherwise specified.

*Example 1*

A propylene adipate polyester having a reacting number of 57.3 and a carboxylic acid number less than 5 was degassed by placing the polypropylene adipate under a vacuum at 100° C. for 10 minutes; then 71.7 parts of the mixed tolylene diisocyanate (80/20 commercial mixture of the 2,4 and 2,6 isomer) was added to the reaction vessel containing 490 parts of the degassed polypropylene adipate. The polyester and diisocyanate were reacted under a vacuum at 120° C. for 30 minutes and then 30.7 parts of bis-(3,3'-aminophenyl) sulfone dissolved in 10 parts of degassed polyester was added and stirred into the polyester diisocyanate reaction mixture. The mixture was stirred for 2 minutes. It was still very fluid and then was poured into a tray to form a sheet 6" x 6" x 1". The tray was placed in an oven at 115° C. for 20 hours, then removed and cooled. The cooled cured stock had a durometer test of 35 to 37 Shore A hardness. This is a most unexpected value for a diamine crosslinked polyester diisocyanate reaction mixture. This stock was placed in the oven again at 115° C. and allowed to stand for 20 minutes. Again, it was removed from the oven. The Shore A hardness on this stock at 115° C. was 30. This retention of hardness at elevated temperature is indeed unexpected. This polyurethane after the second heat treatment was used to run tensile, elongation and smear point tests. The results of these tests are as follows:

Tensile, p.s.i. _____ 3,000
Elongation, percent _____ 740
Smear point, ° F. _____ 345

When methylene-bis-ortho chloroaniline (MOCA) was substituted as a reticulator in the above recipe instead of the bis-aminophenyl sulfone, the resulting product had a Shore A hardness of 67. Also, when orthodichlorobenzidine (ODCB) was substituted in the above recipe for the bis-aminophenyl sulfone the resulting cured polyurethane elastomer had a Shore A hardness of 77. Thus, it should be readily apparent that the use of a chlorinated aromatic diamine to give a polyurethane casting recipe sufficient pot life for making castings also results in the production of inherently harder stocks than when bis-aminophenyl sulfone is used. A similar difference in Shore A hardness is obtained when propylene isocebacate or the polyesteramide obtained by the condensation of propylene glycol, adipic acid with butane diamine is substituted for the propylene adipate in the above formula.

*Example 2*

Instead of using polypropylene adipate, polyethylene adipate was used in this example with the following recipe:

Polyethylene adipate (Reactive No. 67.4, Acid
  No. 0.5) _____parts__ 300
Tolylene diisocyanate (80% 2,4 isomer) __do____ 50.6
Bis (3,3'-amino phenyl )sulfone _____do____ 21.7
Properties:
  Shore A hardness _____ 45
  Tensile, p.s.i. _____ 3,800
  Elongation, percent _____ 600

Additional runs were made using ODCB as the crosslinking or reticulation agent with this recipe. In the run where ODCB was substituted for the bis (3,3'-aminophenyl) sulfone in the above recipe, the cured polyurethane elastomer had a Shore A hardness of 70. This is 25 units harder than the value obtained with bis aminoaryl sulfone as the crosslinker.

*Example 3*

A propylene adipate polyester of about 1800 molecular weight with a reactive number of 56.6 and an acid number less than 5 was reacted with 4,4'-diphenylmethane diisocyanate (MDI) at a reactive ratio of 1 to 1.6. First, the polypropylene adipate was degassed at 100° C. under a vacuum for about 20 minutes, then 51 parts of MDI was added to 250 parts of this polyester. This mixture was allowed to react for about 40 minutes at 100 to 110° C. Then 4,4'-diaminodiphenyl sulfone (14 parts) was added to the reaction mixture, said sulfone diamine being dissolved in 10 parts of the polyester. As this diamine has a very high melting point it is not readily incorporated into the reaction mixture. Therefore, the diamine was incorporated into the polyester at 170° C. The sulfone diamine was added to the reaction mixture and was mixed for about 45 seconds. While the mixture was still fluid, it was poured into molds to form several cast sheets 4" x 4" x ½" and a tensile test strip, and a heart valve. Even after the castings were poured, the reaction mixture was still sufficiently fluid that the remainder of the reaction mixture could be easily poured from the reaction vessel. This reaction mixture had sufficient pot life to permit at least a 35 pound batch to be poured.

*Example 4*

Example 3 was repeated except that the polyester diisocyanate prepolymer was cooled to 80° C. prior to the addition of the sulfone diamine crosslinking agent. At this lower temperature, this batch handled much easier and the length of pour time was increased appreciably. The Shore A hardness of this batch was 45–46.

*Example 5*

To obtain a MOCA crosslink polyurethane elastomer having a relatively low Shore A hardness, another polyester MDI-MOCA polyurethane was prepared using a polyester to MDI molar ratio of 1:1.6. First, the polypropylene adipate polyester was degassed, then 102.5 parts MDI was added to 500 parts of the degassed polyester. The MDI used in this example had 0.01% by weight hydrolyzable chloride present therein to slow down the rate of reaction and to give the reaction mixture increased pot life. This reaction mixture was allowed to react for 20 minutes before the MOCA was added at 80° C. to the prepolymer. The reaction mixture was stirred for 40 seconds after addition of the MOCA. Then it was poured into a mold. This reaction mixture had sufficient pot life to empty the reaction vessel and to permit the pouring of heart valves, an abrasion block and tensile sheets. The abrasion block was cured for 8 hours at 100° C. and cooled. The cured abrasion block had a Shore A hardness of 65.

When 4,4'-diaminodiphenyl sulfone was substituted for the MOCA in the above formula and the MDI used did not contain hydrolyzable chloride, the resulting cast product had a Shore A hardness considerably lower than that obtained with MOCA. Also, the tensile of this elastomer was very good for an elastomer of this Shore A hardness.

Example 6

Three hundred parts of ethylene adipate (reactive number 67.4) was degassed and dried under vacuum for 30–40 minutes at 95° C. Then 150 parts of dry walnut flour as a filler was added to the vacuum vessel. The polyester and filler were stirred for 30 minutes at 90–95° C. under vacuum. Then 63.2 parts of 2,4-tolylene diisocyanate was added to the vessel. The reaction was allowed to continue for one hour and then 36 parts of 3,3′diaminodiphenyl sulfone dissolved in 15 parts of polyester was added. The mix was stirred for one minute and then poured into trays (6 x 6 x 3/16 and heated overnight at 105° C. Then the trays removed from the oven and Shore A hardness was determined on the cooled rubber. The Shore A hardness was 82. Without the filler a Shore A hardness of 55–57 was obtained. Thus, the use of the bis amino-aromatic sulfones as crosslinking agents for a reaction mixture of a polyisocyanate and a polyester diol or polyesteramide permit fillers to be used to increase the hardness of the cured rubber stock and thereby obtain rubber having a lower raw material cost per pound of cured rubber.

Representative examples of fillers generally useful in this invention are the so-called cellulosic powder or flours obtained by grinding such materials as walnut shells, pecan shells, cashew nut shells, peanut shells, and various woods, such as pine, spruce or fir with the harder woods such as oak, walnut, elm being preferred. Of these cellulosic flours the relatively hard flours such as walnut shell is particularly preferred. The cellulosic flours have been found to produce in the cured polyurethane composition very good wearing properties of abrasion resistance, resistance to chipping, splitting, and related properties. It has been found for best results the cellulosic flours should be ground to a size of 100 mesh and preferably 200 mesh. The amount of fillers employed is not too critical and the amount used will be determined primarily by the resulting Shore A hardness desired in the compounded rubber. Normally it is considered that sufficient filler should be added to make this a desirable processing feature to raise the Shore A hardness of the resulting composition to at least about 75 Shore A.

It should be apparent that other well known fillers, such as carbon blacks, clays, silicas, etc. could be used in this invention without departing from its spirit but it should be noted that the cellulosic flours or powder are particularly preferred as they are capable of entering into reaction with diisocyanate to become an integral part of the rubber rather than as a filler per se.

According to this invention it is possible to form a reaction mixture with the organic diisocyanate and the polyester diol or polyesteramide and then cure or crosslink this reaction mixture with an aromatic sulfone diamine to obtain a product which has a relatively low Shore A hardness relative to that obtained with the identical recipe where orthodichlorobenzidine was used as the crosslinker. Where the reaction mixture is made from the organic diisocyanates selected from the following members, TDI, TODI, and MDI, and the polyester diols selected from the following members, ethylene, propylene and butylene polyester adipates, the sulfone diamines give reaction mixtures which have excellent pot life and the cured product has good vibration dampening properties. Thus, these compositions are exceptionally suited for making shock absorbing mountings.

The preferred polyester diols have molecular weights of 1500 to 3500 and are formed by reacting ethylene glycol, propylene glycol, butylene glycol with adipic acid, sebacic acid and the related lower molecular weight dicarboxylic acids, i.e. those having less than about 10 carbon atoms and at least about 6 carbon atoms.

Normally an excess of organic diisocyanate is required to obtain a crosslinked polyurethane elastomer. Applicant has found that where the diisocyanate to polyester ratio is on a molar basis about 2:1 or slightly higher, the resulting elastomer is sufficiently crosslinked to obtain good strength properties and also to permit castings to be made without resorting to special casting techniques. Thus the preferred molar ratio value for making a polyurethane elastomer of this invention is about 1.25 to no greater than about 3. The preferred diisocyanates for use in this invention are TDI, TODI and MDI.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane elastomer comprising the reaction product of an excess of an organic diisocyanate with a material selected from the class consisting of polyester diols and the polyester amides and then crosslinking with a bis (aminoarylene) sulfone.

2. The elastomer of claim 1 wherein the organic diisocyanate is one in which the reaction between orthodichlorobenzidine and said diisocyanate in boiling methylene chloride in semimolar concentration causes no turbidity inside 25 seconds.

3. The product of claim 1 wherein the organic diisocyanate is selected from the class consisting of 4,4′-diphenylmethane diisocyanate, tolylene diisocyanate and tolidine diisocyanate.

4. A process for making polyurethane which is truly crosslinked but still relatively soft comprising reacting a molar excess of an organic diisocyanate with a polyester diol of at least about 700 molecular weight and then crosslinking with bis (aminophenylene) sulfone, said diisocyanate being selected from the class consisting of 4,4′-diphenylmethane diisocyanate, tolylene diisocyanate and tolidine diisocyanate.

5. A process for making a polyurethane elastomer having a Shore A hardness of at least about 30 and less than about 55 from a prepolymer consisting essentially of a polyester diol having a molecular weight of at least about 700 to 3500 and a hydroxyl number substantially greater than the acid number with at least 10% excess organic diisocyanate over the equivalent amount of the polyester diol, the improvement comprising reacting said prepolymer with a bis (amino arylene) sulfone in an amount corresponding to no more than that equivalent to the excess diisocyanate.

References Cited

UNITED STATES PATENTS

| | | | |
|---|---|---|---|
| 2,814,606 | 11/1957 | Stilmar | 260—75 XR |
| 2,917,489 | 12/1959 | Gladding et al. | 260—77.5 |
| 2,989,512 | 6/1961 | Nishk et al. | 260—77.5 |
| 3,164,557 | 1/1965 | Merten et al. | 260—75 XR |

JAMES A. SEIDLECK, *Primary Examiner.*

L. J. BERCOVITZ, *Examiner.*

G. W. RAUCHFUSS, J. J. KLOCKO,
                              *Assistant Examiners.*